(12) United States Patent
Nishi

(10) Patent No.: US 10,533,655 B2
(45) Date of Patent: Jan. 14, 2020

(54) ONE-WAY CLUTCH

(71) Applicant: TSUBAKIMOTO CHAIN CO., Osaka (JP)

(72) Inventor: Takayuki Nishi, Okayama-ken (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 47 days.

(21) Appl. No.: 15/726,457

(22) Filed: Oct. 6, 2017

(65) Prior Publication Data
US 2018/0223986 A1    Aug. 9, 2018

(30) Foreign Application Priority Data

Feb. 8, 2017  (JP) ................................ 2017-020824

(51) Int. Cl.
| F16H 59/02 | (2006.01) |
| F16H 3/10 | (2006.01) |
| F16D 41/04 | (2006.01) |
| F16D 41/067 | (2006.01) |
| F16H 29/06 | (2006.01) |
| F16D 41/08 | (2006.01) |

(52) U.S. Cl.
CPC ......... F16H 59/0213 (2013.01); F16D 41/04 (2013.01); F16D 41/067 (2013.01); F16H 3/10 (2013.01); F16D 41/088 (2013.01); F16H 29/06 (2013.01)

(58) Field of Classification Search
CPC ........ F16H 59/0213; F16H 3/10; F16D 41/04; F16D 41/067; F16J 15/16; F16J 15/32
See application file for complete search history.

(56) References Cited

U.S. PATENT DOCUMENTS

| 2,865,474 A * | 12/1958 | Marland | F16D 41/067 188/264 R |
| 3,044,787 A * | 7/1962 | Derman | F16C 33/7886 277/386 |
| 3,236,337 A * | 2/1966 | Marland | F16D 41/067 188/82.84 |
| 4,210,405 A * | 7/1980 | Jesswein | F16C 11/045 277/500 |
| 4,389,052 A * | 6/1983 | Shimizu | F01D 25/186 277/346 |
| 6,006,881 A * | 12/1999 | Lederman | F16D 41/067 192/113.32 |

(Continued)

FOREIGN PATENT DOCUMENTS

| JP | 52-156263 | 12/1977 |
| JP | 54-36441 | 3/1979 |

(Continued)

*Primary Examiner* — Stacey A Fluhart
(74) *Attorney, Agent, or Firm* — Rankin, Hill & Clark LLP

(57) ABSTRACT

A one-way clutch includes one or more annular members and one or more annular elastic bodies. The annular member is attached to a side plate of an outer race in the axial outer side of a seal member and includes a facing surface that faces an outer circumferential surface of an inner race with a gap and a recess formed in the facing surface. The annular elastic body is fitted into the outer circumferential surface of the inner surface corresponding to the recess so as to be in close contact therewith.

8 Claims, 4 Drawing Sheets

(56) References Cited

U.S. PATENT DOCUMENTS

| | | | | |
|---|---|---|---|---|
| 6,059,292 A * | 5/2000 | Firestone | ............... | F16J 15/14 |
| | | | | 277/301 |
| 2006/0137958 A1* | 6/2006 | Bogdanovic | ......... | B65G 13/075 |
| | | | | 193/35 A |
| 2011/0168119 A1* | 7/2011 | Steele | ................... | F02N 15/023 |
| | | | | 123/179.25 |

FOREIGN PATENT DOCUMENTS

| | | |
|---|---|---|
| JP | 09-151964 | 6/1997 |
| JP | 2004-100744 | 4/2004 |
| JP | 2010-180932 | 8/2010 |

\* cited by examiner

ONE-WAY CLUTCH

TECHNICAL FIELD

The present invention relates to a one-way clutch which has a plurality of cams between an inner race and an outer race and is configured so that when the inner race or the outer race rotates in one direction, the cams engage with the inner race and the outer race and when the inner race or the outer race rotates in another direction, the inner race or the outer race is in the idle mode, and also has a function to prevent foreign matters, such as particles, from entering inside the clutch (hereinafter simply referred to as "dustproof function").

BACKGROUND

A one-way clutch is also used for preventing reverse rotation of rollers of a sloping conveyor, a bucket elevator, etc., and is often used in the environment exposed to particles. Since there is a risk of causing problems such as operation failure of the cam due to the foreign matters that enter inside the one-way clutch, the one-way clutch that has the dustproof function has been developed.

In addition, when the one-way clutch is used for preventing a reverse running of a conveyor etc., the inner race is connected to a rotary shaft and the outer race is prevented from rotating relative to the inner race. And the one-way clutch is configured so that the inner race is in the idle mode when the rotary shaft rotates in the normal direction, and the rotation of the rotary shaft is stopped by engaging the cams with the inner race and the outer race in case the rotary shaft rotates in the reverse direction. When the inner race is in the idle mode, the inner race may be shifted to any direction relative to the outer race due to the vibration of itself and the like. Therefore, a structure for a dustproof function requires allowing the mutual deviation in any direction of the inner race and the outer race. The following are examples of the one-way clutch having such a dustproof function:

Patent document 1 Japanese Unexamined Patent Application Publication No. 1979-36441

Patent document 2 Japanese Unexamined Patent Application Publication No. 1977-156263

A one-way clutch having cams (sprags) between an inner race and an outer race, seal supporters fixed to axial direction outer sides of the outer race than the cams, and oil seals attached to the seal supporters wherein lips of the oil seals contact with the outer circumferential surface of the inner race is disclosed in the patent document 1.

A one-way clutch in patent document 2, as in the case of the patent document 1, has cams (sprags) between an inner race and an outer race, seal supporters fixed to an axial direction outer sides of the outer race than the cams, and oil seals attached to the seal supporters wherein lips of the oil seals contact with the outer circumferential surface of the inner race. Furthermore, the one-way clutch has grease seal members which are attached to the axial direction outer sides of the outer race than the oil seals and have recesses facing the outer circumferential surface of the inner race. The dustproof function can be realized by filling the grease into the recesses of the grease seal members.

When the lips of the oil seals contact with the outer circumferential surface of the inner race of the one-way clutch as described in patent documents 1 and 2, it is sometimes required to replace the oil seals, because the lips contacting with the outer circumferential surface of the inner race wear due to adhesion of particles so that the dustproof function may decrease.

In order to solve the above-mentioned problem, it is also considered that two oil seals are provided in the axial direction so as to prevent particles from entering inside the clutch by the oil seal located outside in the axial direction. In this case, however, not only the axial dimension of the one-way clutch should be large, but also the manufacturing cost may be increased. In addition, there is also a problem that the working conditions of the one-way clutch are restricted by heat generation due to the friction between the oil seal and the inner race.

On the other hand, when additional grease seal members are provided in the one-way clutch as described in the patent document 2, it is temporarily possible to prevent particles from entering the one-way clutch by the grease filled inside the grease seal members. Therefore, the adhesion of particles on the lips of the oil seal can be prevented and the dustproof performance can be enhanced. In order to maintain the dustproof performance, however, it is required that the grease is filled and replaced regularly since the grease is contaminated by the particles and flowing out with time. Therefore, the maintenance is not easy.

SUMMARY

In light of the aforementioned conventional technical problem, the present invention aims to provide a one-way clutch which can be manufactured at low costs, facilitates the maintenance and performs a good dustproof function.

The above-described problems are solved by a one-way clutch including an inner race and an outer race being coaxially disposed to be relatively rotatable with respect to each other; a plurality of cams between the inner race and the outer race being configured to engage with the inner race and the outer race during the rotation of the inner race or the outer race in one direction and not to engage with the inner race and the outer race during the rotation of the inner race or the outer race in another direction; and a seal member being disposed in the axial outer side of the cams and contacting with an outer circumferential surface of the inner race. The one-way-clutch further includes an annular member being disposed on the outer race and including a facing surface that faces the outer circumferential surface in the axial outer side of the seal member with a gap and a recess being formed in the facing surface; and an annular elastic body being fitted into the outer circumferential surface corresponding to the recess so as to be in close contact therewith, wherein a dimension of the gap is smaller than the radial dimension of the annular elastic body; and a clearance in the radial direction is provided between the recess and the annular elastic body.

According to the present invention, since it is possible to prevent foreign matters and the like from entering the one-way clutch by the combination of the annular elastic body and the recess, the adhesion of particles on the lips of the oil seal can be prevented and the dustproof performance can be enhanced. Moreover, since the particles adhering to an annular elastic body are blown off by the centrifugal force of the annular elastic body which rotates in conjunction with the inner race, it is easy to maintain the dustproof performance. Furthermore, even if the inner race in the idle mode is shifted to any direction relative to the outer race due to the vibration of itself, the dustproof performance can be maintained since the annular elastic body mounted on the outer circumferential surface of the inner race may slide on the outer circumferential surface of the inner race as it contacts with the recess. And additionally, the one-way clutch according to the present invention, because of its structure, can be manufactured at low costs, assembled easily and facilitates the maintenance since there is no need to fill and replace grease regularly.

Moreover, if the clearance between the recess of the annular member and the annular elastic body is such that the annular elastic body can contact with the recess without separating away from the outer circumferential surface of the inner race when the annular elastic body is deformed by the centrifugal force generated by the rotation of the inner race, the good dustproof performance can be kept since a gap between the annular elastic body and the outer circumferential surface of the inner race which can be intrusion path of the particles is hardly formed.

Additionally, when space in the axial direction is provided between the seal member and the annular member, the particles and the like can be prevented from adhering to the oil seal since the particles that enter an inner side in the axial direction from the annular member may stay in the space in the axial direction between the seal member and the annular member.

Furthermore, when a plurality of the recesses of the annular member and a plurality of the annular elastic bodies are provided in the axial direction, the particles and the like can be further prevented from adhering to the lip of the oil seal.

In addition, when the annular member is formed as a member separate from the outer race and is connected to a torque arm for fixing the annular member so as not to be rotatable, an influence of the offset load applied to the seal member can be reduced compared with a structure in which the torque arm is connected to the outer race since the offset load generated by the relation between the annular member and the torque arm to be fixed is applied to the seal member through the annular member and the outer race. In this configuration, the one-way clutch can be applied as a safety device which is capable of preventing reverse rotation.

DETAILED DESCRIPTION

With reference to FIGS. 1-4, embodiments of the present invention will be described. The present invention, however, is not limited to these embodiments. In addition, since the basic structure and application of the one-way clutch according to the present invention are well known, explanations of the one-way clutch with illustrations are omitted.

Figure 1:
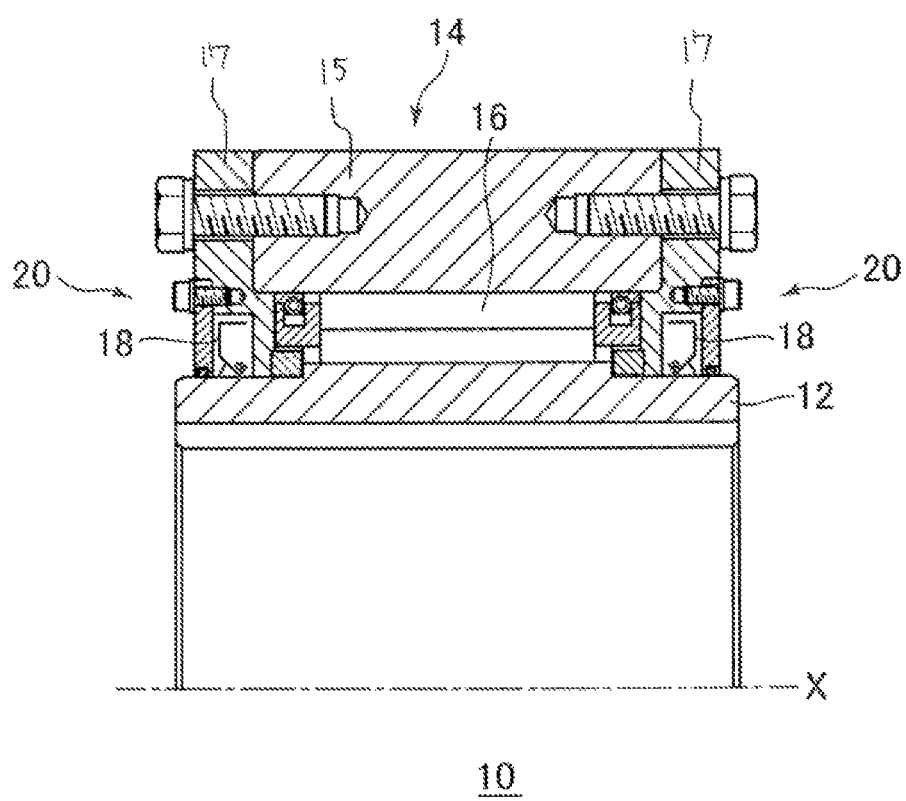
FIG. 1 is a vertical cross sectional view of a first embodiment of the present invention.

A one-way clutch 10 shown in FIG. 1 includes an inner race 12 and an outer race 14 which are coaxially disposed to be relatively rotatable with respect to each other and further includes a plurality of cams 16 between the inner race 12 and the outer race 14 which are configured to engage with the inner race 12 and the outer race 14 during the rotation of the inner race 12 or the outer race 14 in one direction and not to engage with the inner race 12 and the outer race 14 during the rotation of the inner race 12 or the outer race 14 in another direction. Well-known conventional structures are applicable to the structures of the inner race 12, the outer race 14 and the cam 16. In particular, while the outer race 14 of the one-way clutch 10 includes a base member 15 and a pair of side plates 17, they can be integrally formed. In addition, since the one-way clutch 10 is generally disposed symmetrically with respect to the X axis, the lower half of the one-way clutch 10 in FIG. 1 is omitted.

A pair of seal members 18 which contact with the outer circumferential surface 12a of the inner race 12 (See FIG. 2) are disposed in both sides of the axial outer side of the cam 16. Any seal members other than the seal member 18 of the double-lip type as illustrated which can seal the oil or grease filled in the axial inner side of the seal members 18 are also basically applicable as seal members.

Dustproof structures 20 are provided on the axial outer sides of the seal members 18. While each of the dustproof structure 20 is preferably disposed to the pair of the seal members 18 respectively as illustrated, the dustproof structure 20 may be disposed only to one of the seal members 18 depending on a use environment.

Figure 2:
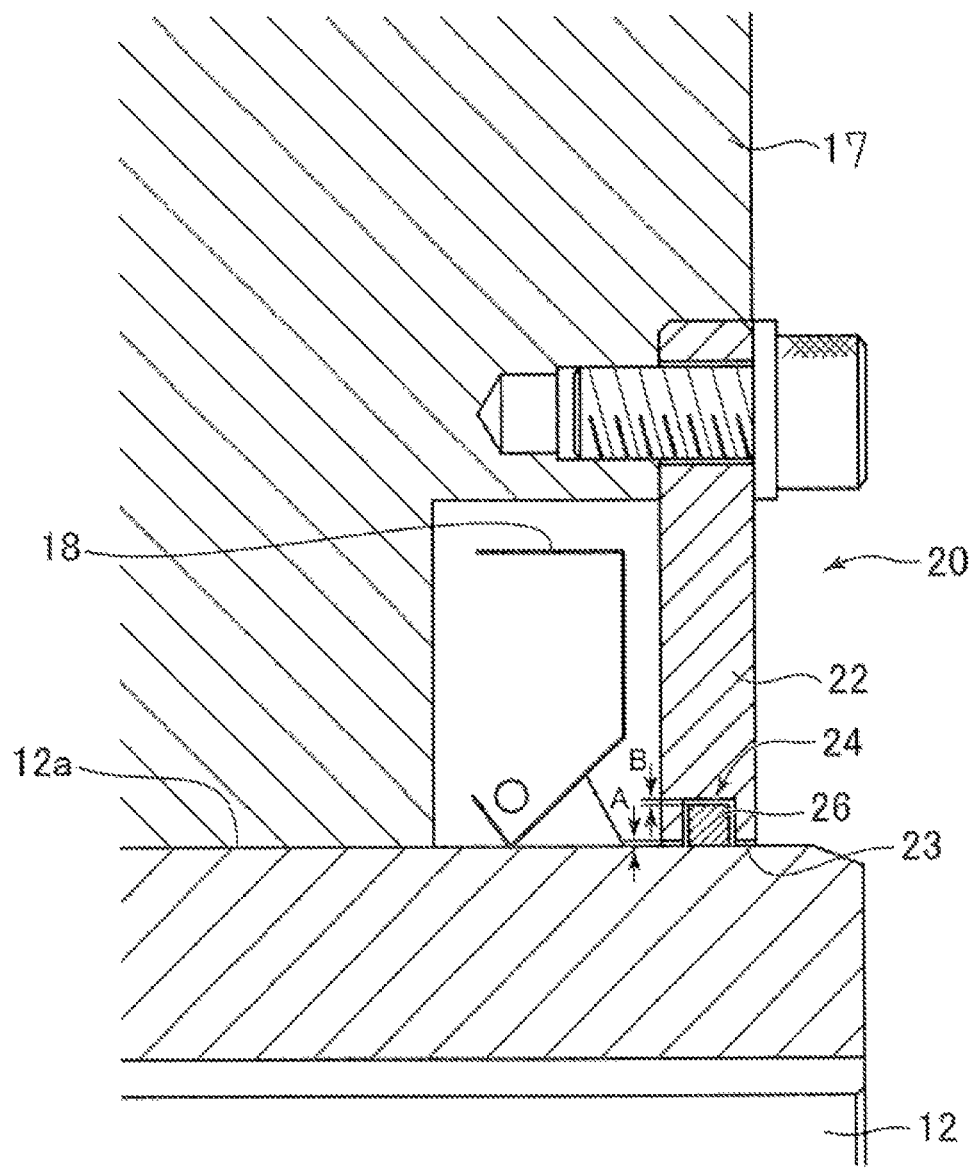
FIG. 2 is an enlarged view of a principal part of FIG. 1.

FIG. 2 is an enlarged view of a principal part of the dustproof structure 20. The dustproof structure 20 includes an annular member 22 attached to the side plate 17 of the outer race 14 and an annular elastic body 26. The annular member 22 includes a facing surface 23 that faces the outer circumferential surface 12a of the inner race 12 with a gap and a recess 24 formed in the facing surface 23. The annular member 22 can be configured to consist of two or more parts. The cross sectional shape of the recess 24 can be formed into a semicircular shape or a triangular shape and the like in addition to the U-shape as illustrated. The annular elastic body 26 is made of a material such as rubber and the like, and is fitted into the outer circumferential surface 12a of the inner surface 12 corresponding to the recess 24 so as to be in close contact therewith. The cross sectional shape of the annular elastic body 26 can be also formed into a circular shape or a triangular shape and the like in addition to the square shape as illustrated.

Dimension A of the gap between the facing surface 23 of the annular member 22 and the outer circumferential surface 12a of the inner race 12 is configured so as to be smaller than the radial dimension of the annular elastic body 26 attached to the outer circumferential surface 12a of the inner race 12. Also, on the other hand, not only the clearance in at least the radial direction, but also in assembling, the clearance in the axial direction is preferably provided between the recess 24 of the annular member 22 and the annual elastic body 26. Thereby, when the inner race 12 and the outer race 14 relatively rotate, friction between the annular body 22 and the annular elastic member 26 can be prevented. In addition, grease or lubricant oil may be applied to the recess 24 of the annular member 22 considering the friction between the recess 24 of the annular member 22 and the annual elastic body 26.

The one-way clutch 10 having the above-mentioned dustproof structure 20, since firstly the annular elastic body 26 can prevent the foreign matters such as particles from entering the one-way clutch 10 through the gap between the facing surface 23 of the annular member 22 and the outer circumferential surface 12a of the inner race 12, can prevent the particles and the like from adhering to the lip of the seal member 18 therefore the dustproof performance can be improved. Even if the particles and the like adhere to the annular elastic body 26, since the particles and the like adhering to the annular elastic body 26 are blown away by the centrifugal force of the annular elastic body 26 which rotates in conjunction with the inner race 12, it is easy to maintain a dustproof performance. Moreover, since the annular elastic body 26 is configured to fit onto the outer circumferential surface 12a of the inner race 12, even if the inner race 12 in the idle mode is shifted to any direction relative to the outer race 14 due to the vibration of itself and the like, the annular elastic body 26 can move on the outer circumferential surface 12a of the inner race 12 as it contacts with the recess 24 of the annular member 22. Thus, the dustproof function is not affected and therefore the dustproof performance can be maintained. Furthermore, the one-way clutch 10 according to the present invention, because of its structure, can be manufactured at low costs, assembled easily, and facilitates the maintenance since there is less need to fill and replace grease regularly as compared with conventional grease seals.

The clearance B between the recess 24 of the annular member 22 and the annular elastic body 26 is preferably such sized that the annular elastic body 26 can contact with the recess 24 without separating away from the outer circumferential surface 12a of the inner race 12 when the annular elastic body 26 is deformed by the centrifugal force generated by the rotation of the inner race 12. Therefore, the good dustproof performance can be kept since the gap between the annular elastic body 26 and the outer circumferential surface 12a of the inner race 12 which can be intrusion path of the particles is not easily formed.

Figure 3:
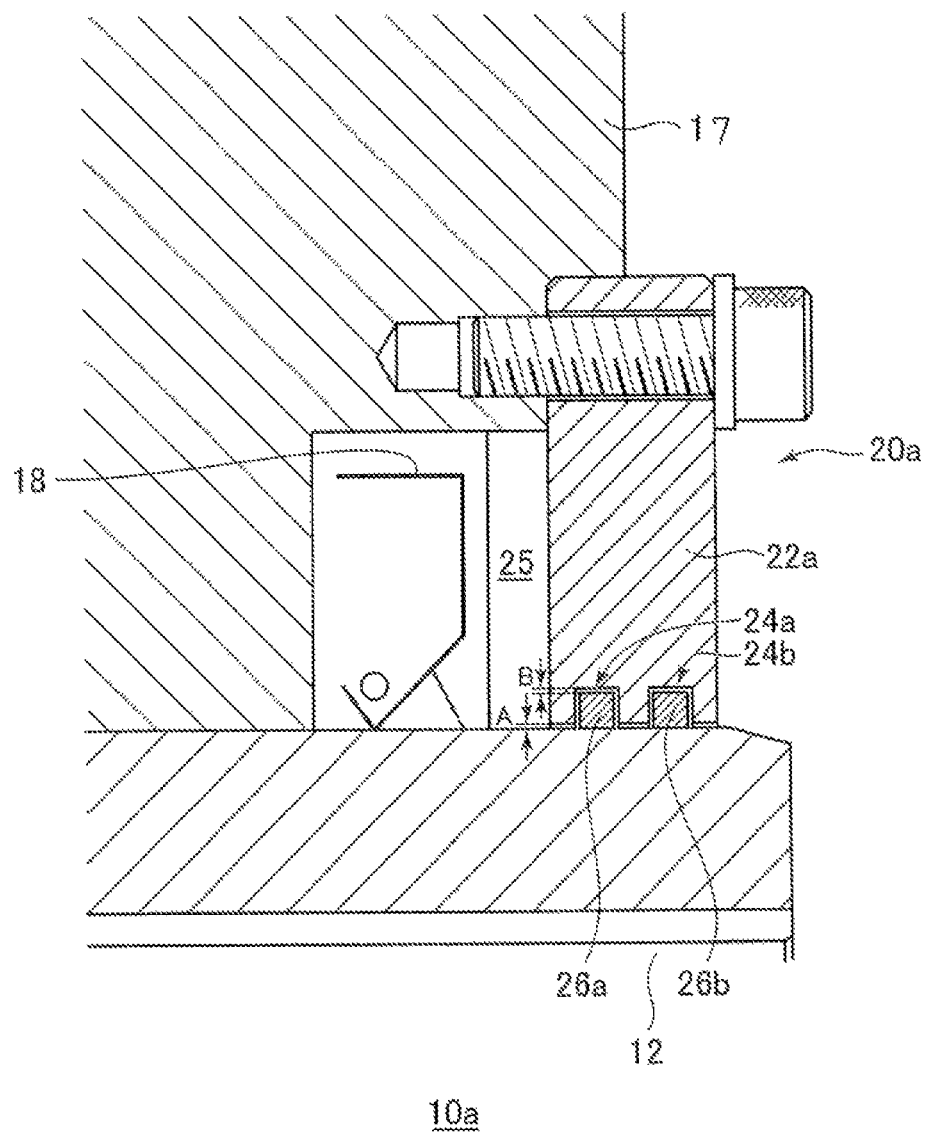
FIG. 3 is an enlarged vertical cross sectional view of a principal part of a second embodiment of the present invention.

Moreover, in the one-way clutch 10, a space 25 in the axial direction can be provided between the seal member 18 and the annular member 22a such as a one-way clutch 10a shown in the FIG. 3. Thereby, the particles and the like can be prevented from adhering to the seal member 18 since the particles which enter an inner side in the axial direction from the annular member 22 may stay in the space 25 in the axial direction between the seal member 18 and the annular member 22a.

Furthermore, a plurality of the recesses of the annular member and a plurality of the annular elastic bodies can be provided in the axial direction such as recesses 24a, 24b of an annular member 22a and annular elastic bodies 26a, 26b in the one-way clutch 10a. Accordingly, the particles and the like can be further prevented from adhering to the lip of the seal member 18 since the particles and the like hardly enter the inner side of the one-way clutch 10a.

Figure 4:
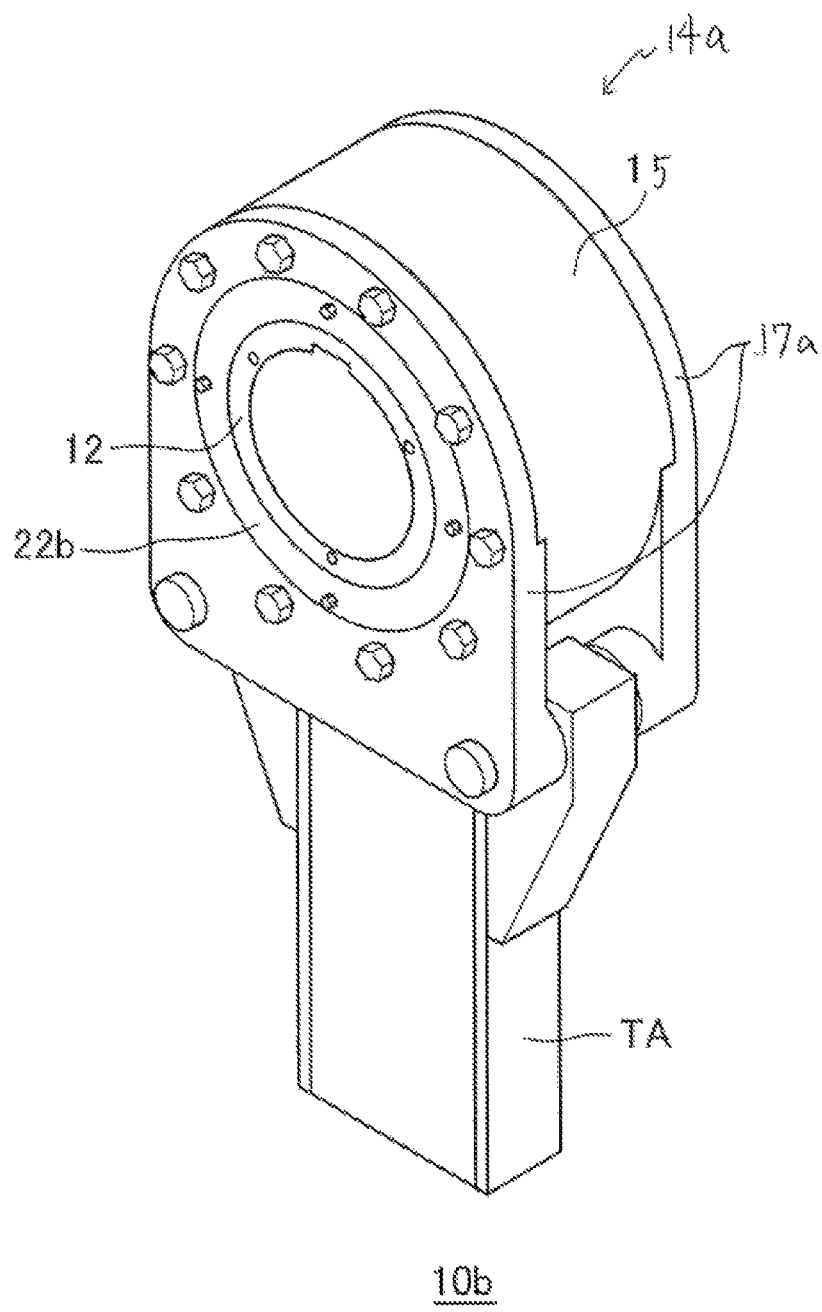
FIG. 4 is a perspective view of a third embodiment of the present invention.

Additionally, like the one-way clutch 10 shown in FIG. 1, when the base member 15 and the side plate 17 are formed as separate members of the outer race 14, a configuration of the side plates 17a is preferably configured to extend outward in their radial directions respectively compared with the both ends of the base member 15 such as the one-way clutch 10a shown in FIG. 4 and a torque arm TA to which the one-way clutch 10a is fixed so as not to be rotatable is also preferably connected to the side plates 17a. At this time, as shown in FIG. 4, it is preferable to put the torque arm TA between a pair of the side plates 17a and to fix them with pins and the like while keeping short intervals between torque arm TA and the side plates 17a in the axial direction. In this configuration, since the offset load generated by the torque arm TA fixed to the side plates 17a is hardly applied to the side plates 17a, an influence of the offset load tending to be applied to the seal member can be reduced. Therefore, the one-way clutch 10b can be suitably applied as a safety device which is capable of preventing reverse rotation.

According to the present invention, as explained above, the one-way clutch which is manufactured at low costs, facilitates the maintenance and performs a good dustproof function can be provided.

EXPLANATION OF REFERENCE NUMBERS 10-10b One-way clutch
12 inner race
12a outer circumferential surface
14 outer race
15 base member
16 cam
17, 17a side plate
18 seal member
22-22b annular member
23 facing surface
24 recess
25 space
26 annular elastic body
TA torque arm It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A one way-clutch comprising:
    an inner race and an outer race being coaxially disposed to be relatively rotatable with respect to each other;
    a plurality of cams between the inner race and the outer race being configured to engage with the inner race and the outer race during the rotation of the inner race or the outer race in one direction and not to engage with the inner race and the outer race during the rotation of the inner race or the outer race in another direction; and
    a seal member being disposed in the axial outer side of the cams and contacting with an outer circumferential surface of the inner race;
    an annular member being disposed on the outer race and including a facing surface that faces the outer circumferential surface in the axial outer side of the seal member with a gap and a recess being formed in the facing surface; and
    an annular elastic body being fitted onto the outer circumferential surface corresponding to the recess so as to be in contact therewith,
    wherein the dimension of the gap is smaller than the radial dimension of the annular elastic body;
    wherein a clearance is provided between the recess and the annular elastic body at least in the radial direction; and
    wherein a space in the axial direction is provided between the seal member and the annular member.

2. The one-way clutch according to claim 1, wherein the clearance is such sized that the annular elastic body can contact the recess without separating away from the outer circumferential surface of the inner race when the annular elastic body is deformed in a radial direction of the inner race.

3. The one-way clutch according to claim 2, wherein the annular member includes a plurality of the recesses provided in the axial direction and a plurality of elastic bodies are respectively in the recesses.

4. The one-way clutch according to claim 1, further including a base member and a side plate, wherein the base member and the side plate are formed as separate members of the outer race; and the side plate is connected to a torque arm for fixing the side plate so as not to be rotatable with respect to the torque arm.

5. A one way-clutch comprising:

an inner race and an outer race being coaxially disposed to be relatively rotatable with respect to each other;

a plurality of cams between the inner race and the outer race being configured to engage with the inner race and the outer race during the rotation of the inner race or the outer race in one direction and not to engage with the inner race and the outer race during the rotation of the inner race or the outer race in another direction; and a seal member being disposed in the axial outer side of the cams and contacting with an outer circumferential surface of the inner race;

an annular member being disposed on the outer race and including a facing surface that faces the outer circumferential surface in the axial outer side of the seal member with a gap and a recess being formed in the facing surface; and an annular elastic body being fitted onto the outer circumferential surface corresponding to the recess so as to be in contact therewith, wherein the dimension of the gap is smaller than the radial dimension of the annular elastic body;

wherein a clearance is provided between the recess and the annular elastic body at least in the radial direction; and wherein the annular member includes a plurality of the recesses provided in the axial direction and a plurality of elastic bodies are respectively in the recesses.

6. The one-way clutch according to claim 5, wherein the clearance is such sized that the annular elastic body can contact the recess without separating away from the outer circumferential surface of the inner race when the annular elastic body is deformed in a radial direction of the inner race.

7. The one-way clutch according to claim 6, wherein a space in the axial direction is provided between the seal member and the annular member.

8. The one-way clutch according to claim 5, further including a base member and a side plate, wherein the base member and the side plate are formed as separate members of the outer race; and the side plate is connected to a torque arm for fixing the side plate so as not to be rotatable with respect to the torque arm.

* * * * *